United States Patent

Okanoue et al.

[11] Patent Number: 5,913,913
[45] Date of Patent: Jun. 22, 1999

[54] CONTROL APPARATUS FOR MOTOR-DRIVEN POWER STEERING SYSTEM OF MOTOR VEHICLE

[75] Inventors: Takahiro Okanoue; Takayuki Kifuku; Shigeki Ohtagaki; Shunichi Wada, all of Tokyo, Japan

[73] Assignee: Mitsubishi Denki Kabushiki Kaisha, Tokyo, Japan

[21] Appl. No.: 08/757,828

[22] Filed: Nov. 27, 1996

[30] Foreign Application Priority Data

Apr. 30, 1996 [JP] Japan ................................. 8-109553

[51] Int. Cl.⁶ .............................. G06G 7/76; B62D 5/04
[52] U.S. Cl. .............................. 701/41; 701/43; 180/446; 180/404
[58] Field of Search .................................. 701/41, 42, 43, 701/36; 180/416, 422, 404, 446; 318/434, 293, 432, 489, 599

[56] References Cited

U.S. PATENT DOCUMENTS

| | | | |
|---|---|---|---|
| 4,869,333 | 9/1989 | Morishita et al. | 180/446 |
| 4,869,334 | 9/1989 | Marumoto et al. | 701/43 |
| 5,078,225 | 1/1992 | Ohmura et al. | 180/446 |
| 5,360,077 | 11/1994 | Nishimoto et al. | 180/446 |
| 5,563,790 | 10/1996 | Wada et al. | 701/41 |
| 5,720,361 | 2/1998 | Nishimoto et al. | 180/446 |
| 5,740,040 | 4/1998 | Kifuku et al. | 701/41 |
| 5,765,661 | 6/1998 | Matsuoka | 701/41 |

FOREIGN PATENT DOCUMENTS 0712775 5/1996 European Pat. Off. .
62-181958 8/1987 Japan .

*Primary Examiner*—Jacques H. Louis-Jacques
*Attorney, Agent, or Firm*—Sughrue, Mion, Zinn, Macpeak & Seas, PLLC

[57] ABSTRACT

A control apparatus for a motor-driven power steering system of a motor vehicle controls the steering system such that a steering torque required to be applied by a driver is prevented from increasing abruptly or steeply even when generation of an assist torque applied to the steering system for assisting the driver in steering operation is to be stopped. The control apparatus includes an operation stop decision mechanism (111, 112, OR) for deciding whether or not an operation stop command is to be issued for stopping control operation for the motor-driven power steering system, a torque detecting mechanism (16, 113) for detecting a steering torque transmitted from an input shaft (21a) to an output shaft (21c) of a steering column (21) of the motor-driven power steering system, and an assist torque control mechanism (114, 116, 117, 118, 13) for updating an assist torque applied by an electric motor (20) to the output shaft (21c) with an assist torque control quantity determined on the basis of a detected torque value outputted from the torque detection mechanism (16, 113), wherein upon issuance of the operation stop command by the operation stop decision mechanism (111, 112, OR), the assist torque control mechanism stops application of the assist torque, provided that the detected torque value is lower than a predetermined value inclusive thereof.

5 Claims, 13 Drawing Sheets

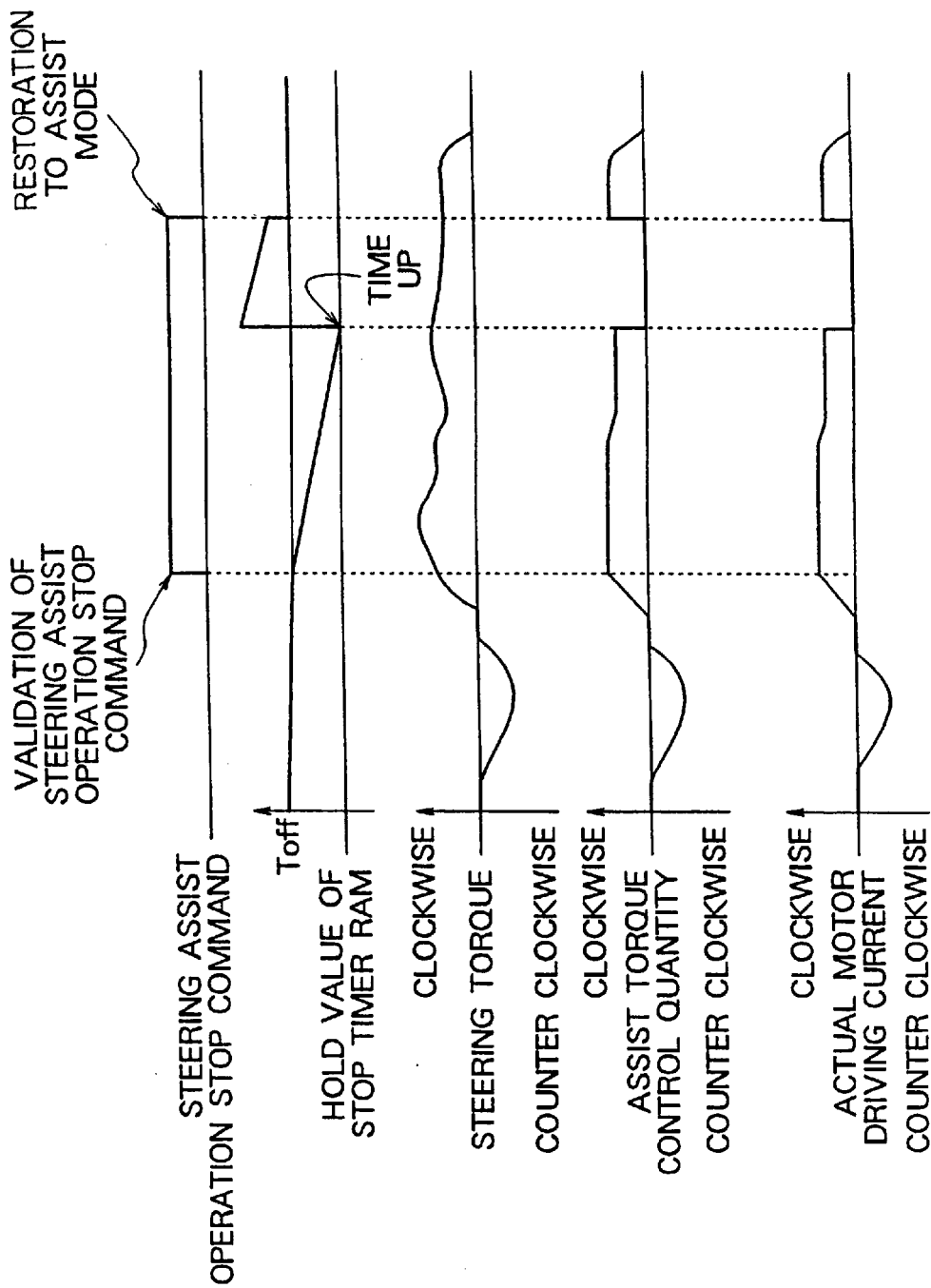

CONTROL APPARATUS FOR MOTOR-DRIVEN POWER STEERING SYSTEM OF MOTOR VEHICLE

BACKGROUND OF THE INVENTION

1. Field of the Invention

The present invention relates generally to a motor-driven power steering control system for a motor vehicle. More specifically, the invention is concerned with a control apparatus for controlling the operation of the motor-driven power steering system which incorporates as a driving source an electric motor energized with a current supplied from an onboard battery of the motor vehicle for generating an assist torque which is applied to an output shaft of the steering system for aiding or assisting a driver in his or her manipulation of a steering wheel.

2. Description of Related Art

As the motor-driven power steering system known heretofore, there may be mentioned, for example, a system disclosed in Japanese Unexamined Patent Application Publication No 94227/1995 under the title "MOTOR-DRIVEN POWER STEERING SYSTEM". In this known motor-driven power steering system, an assist torque is applied to an output shaft operatively coupled to a steering column of the steering system, wherein a magnitude of the assist torque as well as the direction thereof is controlled in accordance with a steering toque applied by a driver to the steering system through the steering wheel of the motor vehicle. To this end, the conventional motor-driven power steering system is provided with a torque sensor for detecting the steering torque applied by the driver. More specifically, a torsion bar is interposed between an input shaft and the output shaft of the steering column, wherein the steering torque applied to the steering wheel is detected by detecting a magnitude of the torsion of the torsion bar as well as a direction thereof.

The conventional motor-driven power steering system further includes a control means for arithmetically determining an assist torque to be applied by an electric motor to the output shaft of the steering column or a steering rack on the basis of the torque detection value derived from the output of the torque sensor so that the manipulation of the steering wheel by the driver becomes optimal with the aid of the assist torque. In such a motor-driven power steering system, the electric power for driving the electric motor dedicated for the generation of the assist torque is usually supplied from an onboard battery mounted on the motor vehicle. Accordingly, with a view to protecting the battery from excessive power consumption which may eventually lead to a so-called dead battery state, operation of the motor is so controlled as to be stopped when engine stall takes place in the course of driving the motor vehicle or when an ignition key of the internal combustion engine is turned off.

In the conventional motor-driven power steering system implemented in the structure mentioned above, there arises such problem that when the engine of the motor vehicle is stopped due to the stall in the course of the steering operation or the opening of the key switch, the assist torque applied to the steering system disappears abruptly because operation of the electric motor and hence generation of the assist torque are so controlled as to be stopped concurrently with the stoppage of operation of the electric motor. As a consequence, there may occur such undesirable situation that the steering wheel is forced to rotate rapidly or abruptly in the direction opposite to the steering direction under the elastic restitution of the torsion bar and the tiers, which provides a great obstacle to the smooth steering operation, remarkably degrading the comfort in driving the motor vehicle. In an extreme case, the driver may have a problem in coping with the abrupt behavior of the steering operation.

SUMMARY OF THE INVENTION

With a view to solving the problems of the conventional motor-driven power steering system described above, it is an object of the present invention to provide a control apparatus for a motor-driven power steering system of a motor vehicle which can control the steering system such that the steering torque required for the driver is prevented from increasing abruptly or steeply even when generation of the assist torque is stopped in the course of operation of the motor-driven power steering system.

In view of the above and other objects which will become apparent as the description proceeds, there is provided according to a general aspect of the present invention a control apparatus for a motor-driven power steering system which apparatus includes an operation stop decision means for deciding whether or not an operation stop command is to be issued for stopping the control operation for the motor-driven power steering system, a torque detecting means for detecting a steering torque transmitted from an input shaft to an output shaft of a steering column of the motor-driven power steering system, and an assist torque control means for updating an assist torque applied by an electric motor to the output shaft with an assist torque control quantity determined on the basis of a detected torque value outputted from the torque detection means by monitoring a detection output signal of the torque detection means, wherein upon issuance of the operation stop command by the operation stop decision means, the assist torque control means stops application of the assist torque, provided that the detected torque value is lower than a predetermined value inclusive thereof.

By virtue of the arrangement of the control apparatus for the power steering system described above, the assist torque applied to the steering system is prevented from disappearing simultaneously with the occurrence of engine stall so long as the steering wheel is operated by the driver. The operation for applying the assist torque is stopped only when a magnitude of the steering torque as applied by the driver decreases below a predetermined value. Thus, vibration or other unwanted behaviors of the steering wheel which may otherwise occur under the influence of elasticity of the torsion bar constituting a part of the steering system as well as the tires upon abrupt stoppage of the assisting torque, can positively be suppressed, whereby comfort of the driver in manipulating the steering handle can significantly be improved, because the steering assist operation can be stopped very smoothly.

Further, even when the key switch is turned off in the state where the assist torque is large, as encountered in the steering operation in the state where the motor vehicle is not running or even when the engine stall phenomenon should occur, the assist torque is prevented from rapid or steep decreasing. Thus, an undesirable situation can be evaded that the steering wheel is abruptly forced to rotate reversely under the influence of elasticity of the torsion bar and the tires, which is of course very uncomfortable for the drivers. Thus, it is possible to realize the motor-driven power steering control system which can ensure very comfortable steering operation with higher security.

In a preferred mode for carrying out the invention, the control apparatus may be arranged such that when the assist torque control means detects that the assist torque applied to the steering system decreases on the basis of the detection output signal of the torque detection means upon issuance of the operation stop command, the assist torque control means then updates the assist torque control quantity with a minimum value of the detection output signal of the torque detection means to thereby limit a magnitude of the assist torque applied to the steering system in conformance with the minimum value, and that when the steering torque detected by the steering torque detection means becomes smaller than a predetermined value inclusive thereof, the assist torque control means stops generation of the assist torque.

With the arrangement of the control apparatus described above, the power steering torque assist operation mode is continued with the magnitude of the assist torque being decreased progressively until the steering operation is stopped even when the engine stall takes place in the course of manipulation of the steering wheel by the driver and even when the control system detects the command for stopping the operation of the motor-driven power steering system. Thus, the steering effort demanded of the driver is prevented from varying steeply or rapidly. In other words, the steering torque to be applied to the steering wheel by the driver increases progressively, whereby he or she can know without fail that operation of the motor-driven power steering control system will have to be stopped.

Besides, even when the key switch is turned off in the state where the assist torque is large as in the case of steering without driving or even when an engine stall phenomenon should occur, the assist torque is caused to decrease not steeply, but progressively. Thus, such an undesirable situation can be evaded where the steering wheel is abruptly forced to rotate reversely under the influence of elasticity of the tires and the torsion bar and the tires. Thus, it is possible to realize the motor-driven power steering control system which can ensure a very comfortable steering operation.

According to another aspect of the present invention, there is provided a control apparatus for a motor-driven power steering system of a motor vehicle, which apparatus includes an operation stop decision means for deciding whether or not an operation stop command is to be issued for stopping a control operation for the motor-driven power steering system, a torque detecting means for detecting a steering torque transmitted from an input shaft to an output shaft of a steering column of the motor-driven power steering system, and an assist torque control means for updating an assist torque applied by an electric motor to the output shaft with an assist torque control quantity determined on the basis of a detected value of a motor current flowing through the electric motor by monitoring the motor current, wherein upon issuance of the operation stop command by the operation stop decision means, the assist torque control means stops application of the assist torque, provided that the detected value of the motor current is lower than a predetermined value inclusive thereof.

With the arrangement of the control apparatus for the power steering system, operation of the driving motor is not stopped immediately upon issuance of the operation stop command so long as the motor is in the driving state but is allowed to continue the driving operation while the motor driving current is monitored, wherein when the driving current becomes lower than a predetermined value, operation of the driving motor and hence generation of the assist torque is stopped. Thus, there can be obtained an advantageous effect that the assist torque applied to the steering system can be cleared smoothly without giving rise to such unwanted phenomena as mentioned hereinbefore, while ensuring comfortableness for the driver in his or her steering operation.

Besides, even when the key switch is turned off in the state where the assist torque is large as in the case of steering without driving or even when an engine stall phenomenon should occur, the assist torque is prevented from rapid or steep reduction. Thus, an undesirable situation can be evaded that the steering wheel is abruptly forced to rotate reversely under the influence of significant elasticity of the torsion bar and the tires. In other words, it is possible to realize the motor-driven power steering control system which can ensure a very comfortable steering operation with higher security.

In another preferred mode for carrying out the invention, the control apparatus may be arranged such that when the assist torque control means detects that the motor current flowing through the electric motor decreases on the basis of the detected current value upon issuance of the operation stop command, the assist torque control means updates the assist torque control quantity with a minimum value of the motor current to thereby limit a magnitude of the assist torque applied to the steering system in conformance with the minimum value. On the other hand, when the motor current becomes smaller than a predetermined value inclusive thereof, the assist torque control means stops generation of the assist torque.

With the arrangement of the control apparatus described above, the power steering torque assist mode is continued with the magnitude of the assist torque being decreased progressively until the steering operation is stopped, even when the engine stall takes place in the course of manipulation of the steering wheel and even when the control system detects the command for stopping the operation of the motor-driven power steering system. Thus, the steering efforts demanded for the driver is prevented from varying steeply or rapidly, because the steering torque to be applied to the steering wheel increases only progressively, whereby he or she can know that operation of the motor-driven power steering control system will soon come to an end.

Besides, even when the key switch is turned off in the state where the assist torque is large as in the case of steering in the state in which the motor vehicle is not running or even when an engine stall should occur, the assist torque is decreasing not steeply but progressively. Thus, an undesirable situation can be evaded that the steering wheel is abruptly forced to rotate reversely under the elasticity of the torsion bar and others. Thus, it is possible to realize the motor-driven power steering control system which can ensure a comfortable steering operation with high reliability.

In a further preferred mode for carrying out the invention, a motor driving current command value determined on the basis of at least the detected steering torque may be employed in place of the motor current flowing through the electric motor.

With the arrangement described above, the control apparatus according to the present invention can be implemented easily without need for providing additional hardware, to another great advantage from the economical view point.

In a yet further preferred mods for carrying out the invention, the control apparatus may further include a timer means for counting a time lapse from a time point at which the operation stop command is issued. In that case, the assist torque control means is so arranged as to stop generation of the assist torque when the time lapse exceeds a predetermined value.

With the arrangement of the control apparatus described above, generation and application of the assist torque can positively be stopped upon lapse of a predetermined time from a time point when the operation stop command is issued. Thus, the wasteful power consumption of the battery can effectively be suppressed, to a further advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 13 is a waveform diagram for illustrating operation of the control apparatus according to the fourth embodiment of the present invention.

DESCRIPTION OF THE PREFERRED EMBODIMENTS

Figure 1:
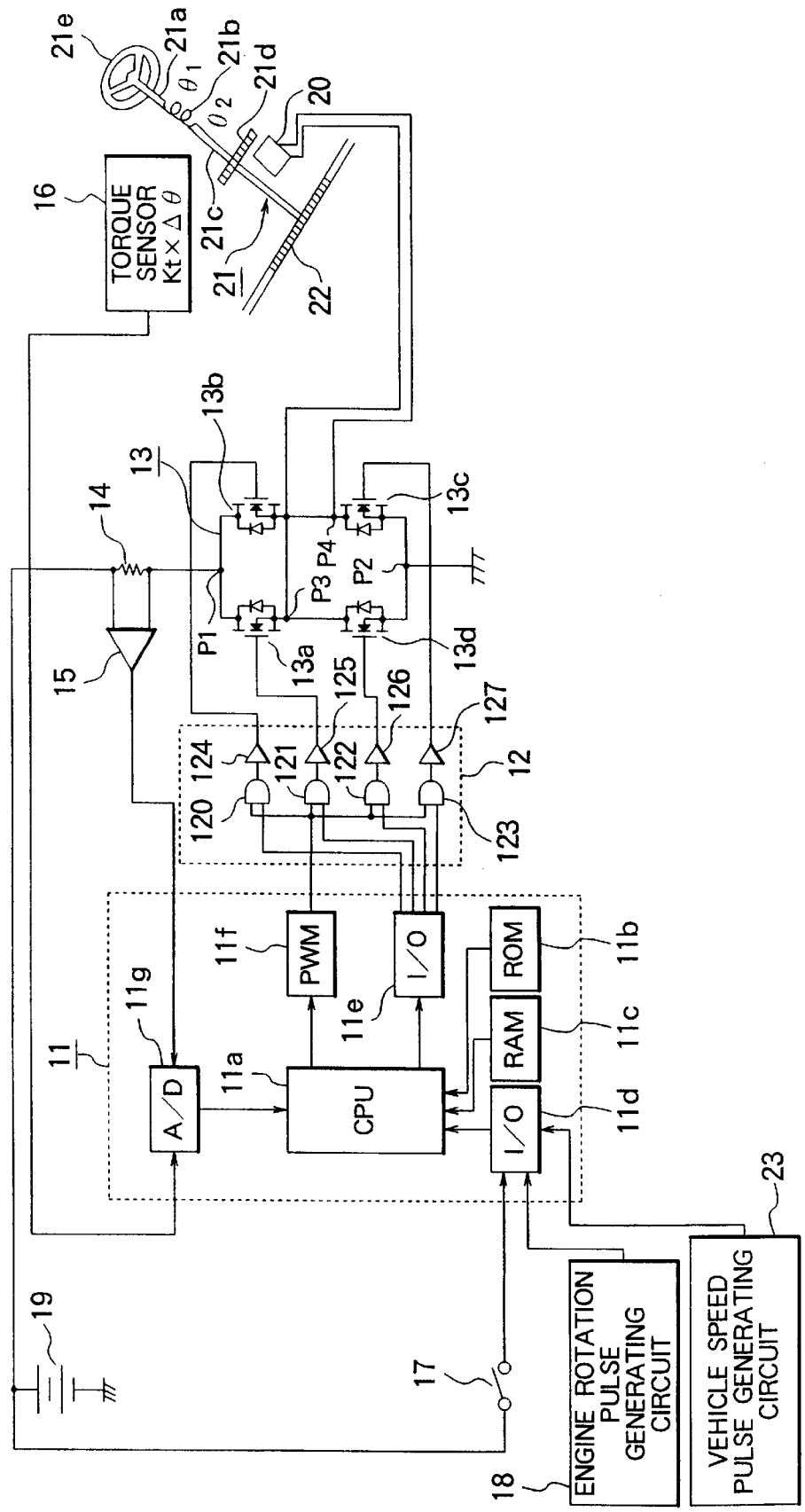
FIG. 1 is a block diagram showing generally an arrangement of a motor-driven power steering system to which the present invention is applied.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally an arrangement of the motor-driven power steering system to which the control apparatus according to a first embodiment of the present invention is applied. As can be seen from the figure, the control apparatus includes as a primary component thereof a control processor unit 11 which is implemented by employing a microcomputer to serve for controlling the operation of the motor-driven power steering system.

Referring to FIG. 1, the control processor unit 11 is comprised of a central processing unit (hereinafter referred to simply as the CPU) 11a for executing control processings, data input/output processings and others, a read-only memory (hereinafter referred to simply as the ROM) 11b for storing control programs executed by the CPU 11a as well as data therefor and other data, a random access memory (hereinafter referred to simply as the RAM) 11c for storing the data obtained as the result of execution of the processings and the arithmetic operations performed by the CPU 11a as well as input/output data, an input/output interface 11d for controlling input operations for inputting to the CPU 11a a key input signal supplied from an ignition key switch circuit 17 provided in association with an internal combustion engine (hereinafter referred to simply as the engine) of a motor vehicle, a rotation pulse signal supplied from an engine-rotation-pulse generating circuit 18 and a vehicle-speed pulse signal supplied from a vehicle-speed-pulse generating circuit 23, an input/output interface 11e for controlling output operations for outputting a rotational direction signal of an electric motor constituting a driving source of the motor-driven power steering system from the CPU 11a as described hereinafter, a pulse width modulator 11f for modulating the pulse width of a control signal with the output signal from the CPU 11a to thereby generate a duty-ratio signal, and an analogue-to-digital converter (hereinafter referred to simply as the A/D converter) 11g for performing analogue-to-digital (A/D) conversion of a torque sensor detection signal and a motor driving current detection signal supplied to the control processor unit 11 to thereby provide input corresponding to the digital signals to the CPU 11a.

The rotational direction signal and the duty-ratio signal are inputted to a MOS-FET driving circuit 12, wherein the duty-ratio signal is applied in common to first input terminals of four logical AND circuits 120 to 123, respectively, while the rotational direction signal is applied separately to the second input terminals of the logical AND circuits 120 to 123, respectively. Connected to the output terminals of the logical AND circuits 120 to 123 are inverters 124 to 127, respectively. Thus, the outputs of the logical AND circuits 120 to 123 are supplied via the inverters 124 to 127 to a motor driving H-bridge circuit 13 which is constituted by four power MOS FETs (Metal-Oxide-Semiconductor Field Effect Transistors) 13a to 13d interconnected in the form of an H-bridge circuit.

A connecting node P1 located between the power MOS FETs 13a and 13b of the motor driving H-bridge circuit 13 is connected to one electrode of a vehicle-onboard battery 19 mounted on the motor vehicle and having the other electrode of the ground potential level by way of a motor driving current detection circuit 15 which is comprised of a resistor 14 and an amplifier, while a connecting node P2 located between the power MOS FETs 13d and 13c of the motor driving H-bridge circuit 13 is connected to the ground potential. Further, inserted between a connecting node P3 located between the power MOS FETs 13a and 13d and a connecting node P4 located between the power MOS FETs 13b and 13c of the motor driving H-bridge circuit 13 is a DC motor 20 which serves for generating an assist torque for the motor-driven power steering system.

The individual power MOS FETs 13a to 13d interconnected in the form of an H-bridge as described above have respective gate electrodes to which the duty-ratio signal which determines magnitude of the actual motor driving current for energizing the motor 20 is inputted via the inverters 124 to 127, respectively, whereby these power MOS FETs 13a to 13d are turned on/off in conformance with the duty ratio of the duty-ratio signal.

A steering column 21 constituting a major part of the steering mechanism is comprised of an output shaft 21c having a pinion gear mounted at an end portion thereof at a position to mesh with a steering rack 22, an input shaft 21a having one end coupled to a steering wheel 21e and the other end coupled to the output shaft 21c by way of an interposed torsion bar 21b, and a reduction gear 21d for transmitting the output torque of the DC motor 20 to the output shaft 21c with a predetermined gear ratio.

Next, before entering into a detailed description of the control apparatus according to the present invention, operations of the motor-driven power steering system to which the instant embodiment of the invention is applied will be described briefly.

The MOS-FET driving circuit 12 responds to the duty-ratio signal outputted from the pulse width modulator 11f and the rotational direction signal for the DC motor 20 inputted through the input/output interface 11e, to thereby allow the motor driving current to be supplied to the DC motor 20 from the battery 19 through the MOS-FET H-bridge circuit 13. Thus, the torque generated by the DC motor 20 and applied to the steering system is controlled by the duty-ratio signal while the rotating direction of the DC motor 20 is controlled by the rotational direction signal.

The actual motor driving current supplied to the DC motor 20 from the battery 19 is detected by the motor driving current detection circuit 15 as a voltage signal which makes appearance across the resistor 14. The voltage signal is then amplified by the amplifier incorporated in the motor driving current detection circuit 15 to be subsequently inputted to the A/D converter 11g of the control processor unit 11 which is constituted by a microcomputer, as mentioned previously. Furthermore, the key signal generated by the ignition key switch circuit 17 in response to manipulation of the ignition key of the motor vehicle by the driver, the rotation pulse signal outputted from the engine-rotation-pulse generating circuit 18 and the vehicle-speed pulse signal outputted from the vehicle-speed-pulse generating circuit 23 are inputted to the CPU 11a by way of the input/output interface 11d. Thus, the start of the engine operation, the engine rotation number and the speed of the motor vehicle can be detected by the CPU 11a on the basis of these input signals.

More specifically, the CPU 11a responds to the inputting of the engine rotation number signal to thereby decide that an electric power is supplied to the DC motor 20 which constitutes a so-called assist torque generation source for generating an assist torque which is applied to the power steering system via the reduction gear 21d for aiding or assisting the driver in his or her manipulation of the steering wheel. Further, upon detection of the vehicle-speed pulse signal (i.e., upon detection that the motor vehicle is running), the CPU 11a determines arithmetically the magnitude of the assist torque to be applied to the steering system on the basis of the steering torque as applied by the driver while taking into account the speed at which the motor vehicle is running. The steering torque is detected in the manner mentioned below.

When the steering torque is applied to the input shaft 21a by the driver by manipulating the steering wheel 21e, the steering torque as applied is transmitted to the steering rack 22 by way of the torsion bar 21b and the output shaft 21c of the steering column 21. In that case, the torsion bar 21b having a modulus of elasticity represented by Kt undergoes a torsion over an angle $\Delta\theta$ in dependence on the magnitude Tm of the steering torque as applied by the driver. The magnitude of the torsion (which may be given by $Kt \times \Delta\theta$) as well as the direction thereof is detected by means of a torque detection signal generating circuit 16 including a torque sensor provided in association with the torsion bar 21b. The output of the torque detection signal generating circuit 16 is supplied to the control processor unit 12 as the steering torque signal. On the other hand, the assist torque generated and applied to the steering system by the DC motor 20 is intensified through the reduction gear 21d provided between the DC motor 20 and the output shaft 21c of the steering column 21. Thus, the steering rack 22 is driven under the effect of both the torque, i.e., the steering torque applied by the driver on one hand and the assist torque generated by the DC motor 20 on the other hand.

Figure 2:
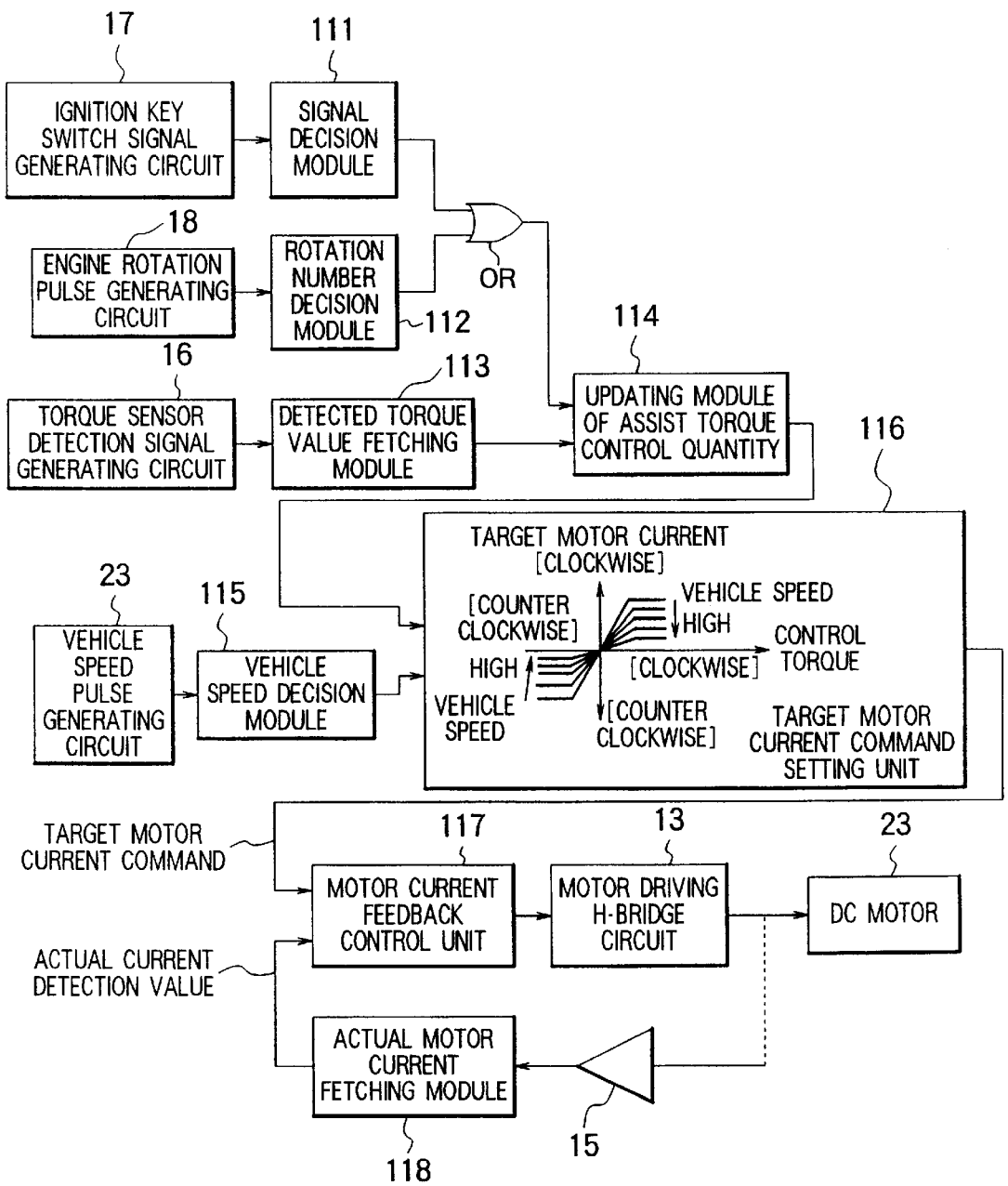
FIG. 2 is a functional block diagram showing generally a configuration of control apparatus for a motor-driven power steering system with which the first, second and fourth embodiments of the present invention can be carried out.

FIG. 2 is a functional block diagram showing generally a configuration of the control apparatus for the motor-driven power steering system according to the instant embodiment of the present invention and illustrates functions or operations of the control processor unit 11 among others. In FIG. 2, parts which are the same as or equivalent to those shown in FIG. 1 are denoted by like reference characters. Further, in FIG. 2, blocks designated by reference characters 111 to 118 represent hardwarewise the functions realized by the CPU 11a of the control processor unit 11. Of course, some of these functions may be realized by hardware and/or firmware.

Now, referring to FIG. 2, a signal decision module 111 responds to a key switch signal supplied from the ignition key switch signal generating circuit 17 (which corresponds to an ignition key switch circuit of the motor vehicle), to thereby output a key-off signal when it is decided that the ignition key switch is turned off by the driver. On the other hand, a rotation-number decision module 112 provided in combination with the signal decision module 111 is so designed as to make a decision on the basis of the rotation pulse signal inputted from the engine-rotation-pulse generating circuit 18 as to whether or not the engine rotation number is smaller than a predetermined value inclusive thereof. When this decision results in affirmation (YES), then the rotation-number decision module 112 outputs a decision signal indicating this fact (i.e., the engine operates at a speed lower than a predetermined speed) When either one of the key-off signal or the decision signal mentioned above is issued, a logical sum circuit (OR circuit) designated by reference character OR outputs an operation stop command signal to an assist torque control quantity updating module 114 in order to stop the power steering operation mode (i.e., assist torque generation mode) of the steering system.

Provided in association with the torque sensor detection signal generating circuit 16 is a detected torque value fetching module 113 which fetches a torque sensor detection signal outputted from the torque sensor detection signal generating circuit 16 which includes a conventional torque sensor element known per se, as mentioned previously, to thereby output the torque sensor detection signal which is than supplied to the assist torque control quantity updating module 114. In this conjunction, it is to be noted that so long as the power steering operation mode stop command signal is not issued from the OR circuit (OR) mentioned hereinbefore, the assist torque control quantity updating module 114 supplies the inputted torque sensor detection signal to a target-motor-current command setting unit 116 as a control signal indicating a control quantity for the generation of the assist torque to be applied to the motor-driven power steering system.

The target-motor-current command setting unit 116 sets a target motor current command for the DC motor 20 on the basis of the control signal as inputted from the assist torque control quantity updating module 114 on one hand and the vehicle speed signal on the other hand. The vehicle speed signal is generated by a vehicle speed decision module 115 on the basis of the vehicle-speed pulse signal inputted from the vehicle-speed-pulse generating circuit 23. As can be seen from graphical representation shown within the block 116 in FIG. 2, the magnitude of the assist torque to be applied to the steering system is ordinarily decreased as the vehicle speed is higher. The target motor current command outputted from the target-motor-current command setting unit 116 is utilized for controlling the motor driving H-bridge circuit 13 by way of a motor current feedback control unit 117 to thereby allow the actual motor driving current corresponding to the target motor current command supplied from the target-motor-current command setting unit 116 to flow through the DC motor 20.

The actual motor driving current is detected by the motor driving current detection circuit 15 including the resistor 14 to be subsequently inputted to an actual motor current fetching module 118, which responds thereto by feeding back the actual motor driving current to the input of the motor current feedback control unit 117 as an actual motor current detection value. The motor current feedback control unit 117 in turn controls the actual motor driving current flowing through the DC motor 20 by way of the motor driving H-bridge circuit 13 so that the difference between the target motor current command supplied from the target-motor-current command setting unit 116 and the actual current detection value supplied from the actual motor current fetching module 118 disappears.

Figure 3:
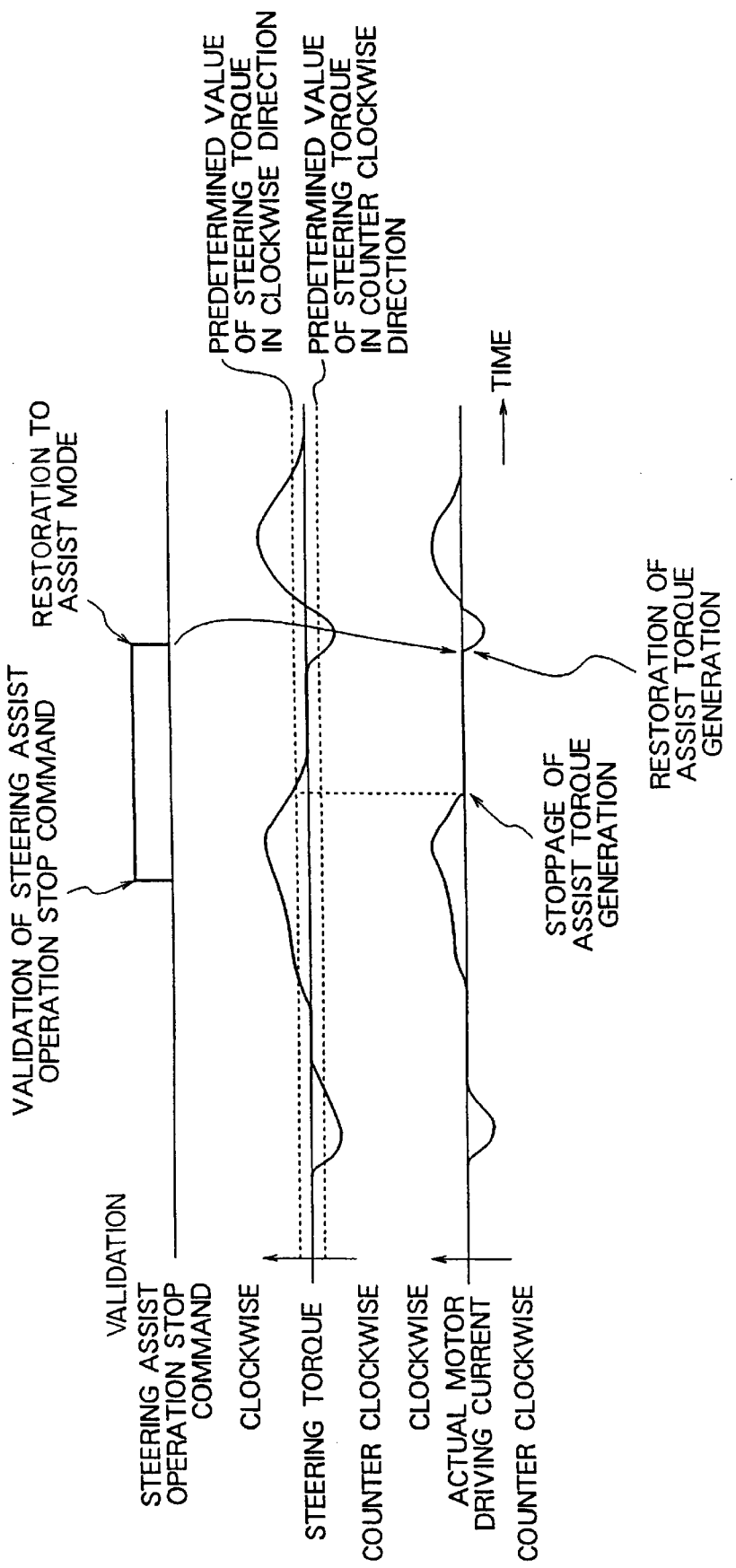
FIG. 3 is a waveform diagram for illustrating control procedure for stopping an assist torque generation mode according to a first embodiment of the invention.
Figure 4:
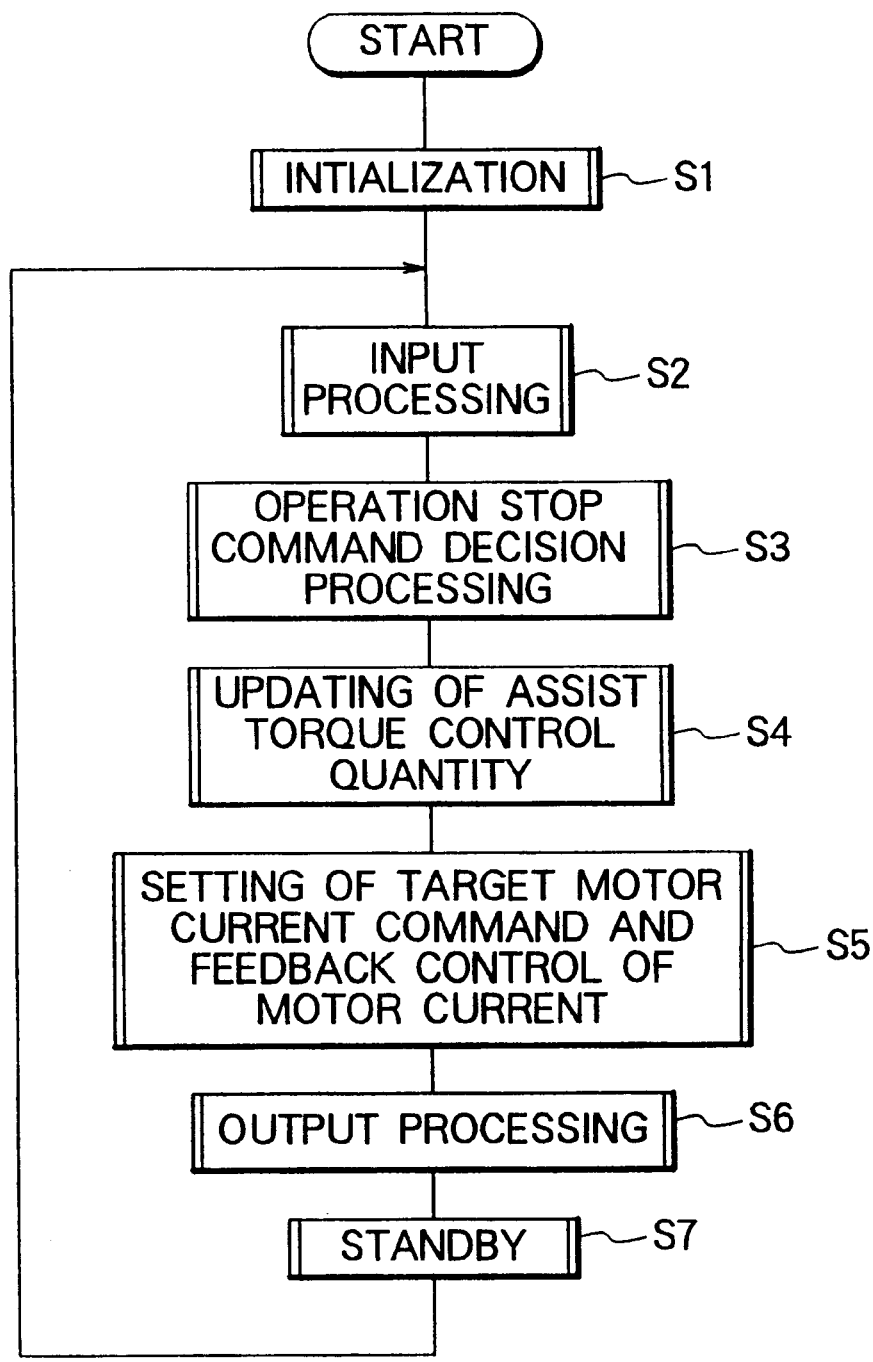
FIG. 4 is a flow chart for illustrating a processing procedure executed by a CPU incorporated in the control apparatus according to the first, second and fourth embodiments of the invention.
Figure 5:
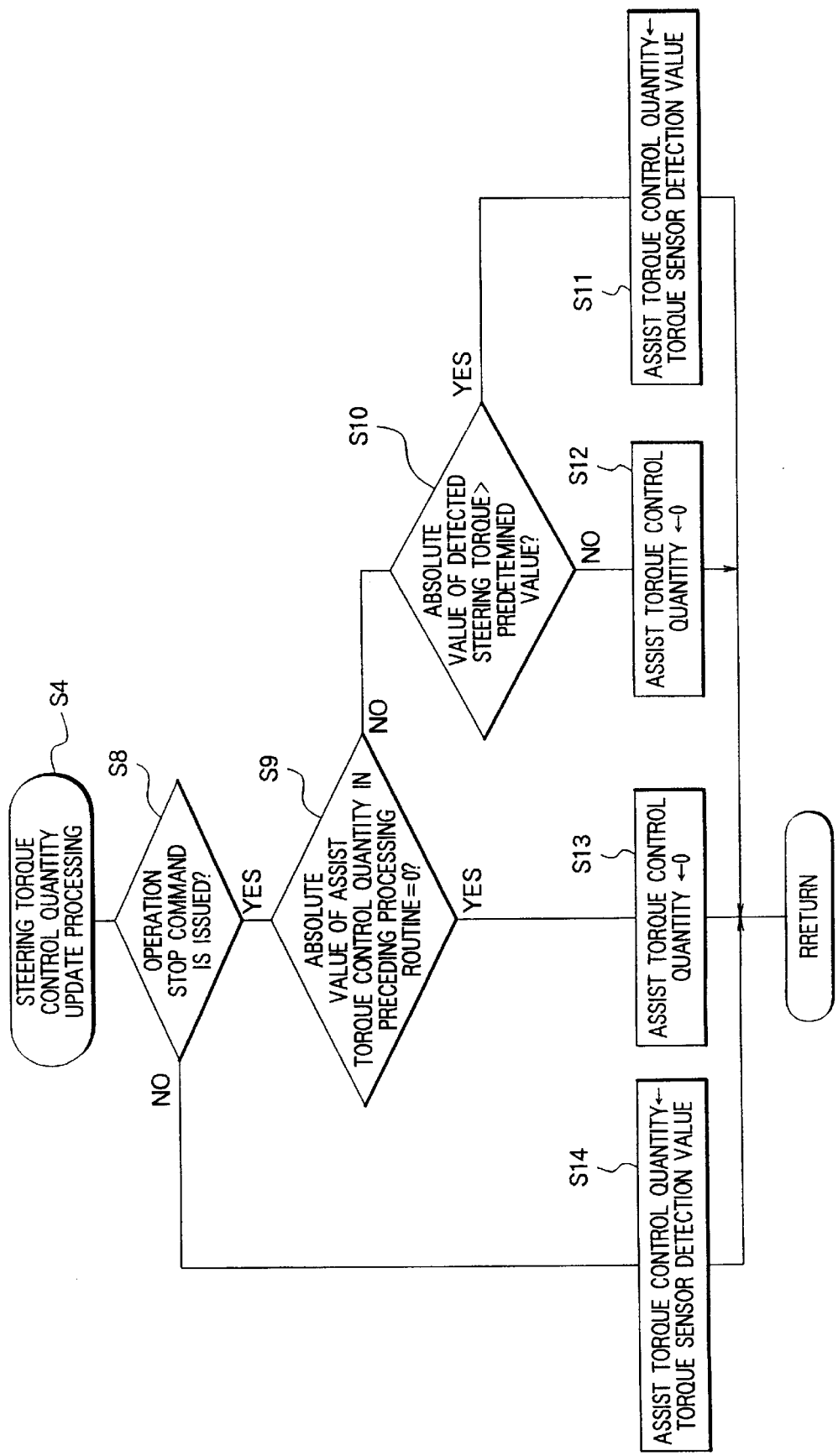
FIG. 5 is a flow chart for illustrating an assist torque control quantity update processing procedure according to the first embodiment of the invention.

Next, the description will turn to the processings executed by the CPU 11a of the control apparatus for the motor-driven power steering control system according to the instant embodiment by reference to FIG. 3 together with FIGS. 4 and 5, in which FIG. 3 is a waveform diagram for illustrating changes or variations of the steering torque and the actual motor driving current, respectively, at a time point when an operation stop command is issued to the motor-driven power steering system, FIG. 4 is a flow chart for illustrating control processings executed by the CPU 11a for controlling the DC motor 20 in dependence on the change or variation of the steering torque, and FIG. 5 is a flow chart for illustrating the assist torque control quantity update processings executed by the CPU 11a in dependence on presence or absence of the operation stop command for the motor-driven power steering system.

At first, it should be mentioned that the CPU 11a is so programmed as to execute a series of processings or a processing routine, which is composed of a data input processing (step S2), an operation stop command decision processing (step S3), an assist torque control quantity update processing (step S4), setting of a target motor current command and a motor current feedback control (step S5), an output processing (step S6) and a standby processing (step S7) sequentially in this order, as can be seen in the flow chart shown in FIG. 4. The processing routine mentioned above is repetitively executed as an interruption routine periodically at a predetermined time interval t1.

In the data input processing step S2, there are inputted or supplied to the CPU 11a of the control processor unit 11 the torque detection signal from the torque sensor detection signal generating circuit 16, the key signal from the ignition key switch signal generating circuit 17, the rotation pulse signal from the engine-rotation-pulse generating circuit 18, the actual motor driving current from the motor driving current detection circuit 15 and the vehicle-speed pulse signal from the vehicle-speed-pulse generating circuit 23.

In the operation stop command decision processing step S3, the steering assist operation stop command is validated after lapse of a predetermined time from the time point at which the key-off state is detected on the basis of the key signal supplied from the ignition key switch signal generating circuit 17 or the detection output signal of the engine-rotation-pulse generating circuit 18 indicating that the engine rotation speed (rpm) determined by a rotation pulse counting operation is lower than a predetermined engine speed, as is illustrated in FIG. 3.

In the assist torque control quantity update processing step S4, the torque sensor detection values determined by the input processing at every periodical time interval t1 are checked. Additionally, presence or absence of the operation stop command is checked as well. On the basis of the results of these checks, the assist torque control quantity for controlling the assist torque is determined.

For the determination of the assist torque control quantity, it is checked whether or not the operation stop command is issued or not (step S8), as is shown in the flow chart of FIG. 5. When no operation stop command is issued (i.e., when the answer of the decision step S8 is "NO"), the torque sensor detection value is determined as the value for the assist torque control quantity (step S14).

On the other hand, in case the operation stop command is issued (i.e., when the answer of the decision step S8 is "YES"), it is then checked whether or not the absolute value of the assist torque control quantity determined in the preceding processing routine (FIG. 4) was equal to zero (step S9). If so ("YES"), the assist torque control quantity is set to zero regardless of the current torque sensor detection value derived from the output of the torque sensor circuit 16 (step S13). When the power steering operation (i.e., assist torque steering operation mode) is stopped, the DC motor 20 is inhibited from generating the assist torque until the operation stop command is cleared (see FIG. 3).

On the contrary, in case the absolute value of the assist torque control quantity determined in the preceding processing routine (FIG. 4) is not zero, the absolute value of the torque sensor detection value is compared with a predetermined value (step S10). When the former is smaller than the latter inclusive, the assist torque control quantity is set to zero. By contrast, when the former is greater than the predetermined value, the torque sensor detection value mentioned above is determined as the assist torque control quantity (step S11).

Next, in the target motor current command setting/motor current feedback control processing step S5 (FIG. 4), the target motor driving current command is determined on the basis of the assist torque control quantity value determined in the step S4 and the vehicle speed value determined in the step S2 (see FIG. 2, block 116). Furthermore, the actual current detection value of the DC motor 20 detected by the motor driving current detection circuit 15 and the target motor driving current command outputted from the targetmotor-current command setting unit 116 are compared with each other, whereon the duty ratio of the motor drive control signal is so determined that the deviation or difference between the actual current detection value and the target motor current command value converges to zero.

In the output processing step S6, the motor drive control signal of the duty ratio as determined is outputted to the motor driving H-bridge circuit 13. Thus, the motor driving H-bridge circuit 13 is so controlled as to allow the actual motor driving current to flow through the DC motor 20 for generating the optimal assist torque for assisting the steering operation performed by the driver.

At this juncture, it should be mentioned that because the actual motor driving current of the DC motor 20 is determined on the basis of the assist torque control quantity and the vehicle speed determined in the step S4, the assist torque control quantity is prevented from assuming the value of zero until the steering torque applied by the driver becomes smaller than a predetermined value even when the engine stall or the like phenomenon mentioned hereinbefore should occur with the engine rotation number decreasing below a predetermined value and even when the operation stop command is issued. In that case, the assist torque control quantity is updated on the basis of the torque sensor detection value so that the steering assist operation can be continued by allowing the assist torque to be generated. In the standby or waiting step S7, it is decided whether the time period t1 has lapsed or not. When the time period t1 has lapsed, the input processing step S2 is regained, whereupon the processing routine described above is repeated.

As is apparent from the foregoing description, in the motor-driven power steering control system according to the instant embodiment of the invention, generation of the assist torque is continued so long as the steering operation is performed by the driver notwithstanding of occurrence of the engine stall or the like event during manipulation of the steering handle. Thus, the steering efforts as demanded for the driver can remain in a steady and stable state without being susceptible to rapid variations or fluctuations. Besides, even when the key switch is turned off in the state where the assist torque is large as in the case of the steering without driving or even when the engine stall phenomenon should occur, the assist torque is prevented from decreasing rapidly or steeply. Thus, an undesirable situation can be evaded where the steering wheel is forced to rotate reversely under the influence of elasticity of the torsion bar 21b and the tires, which of course involves great discomfort for the driver. Thus, according to the teachings of the present invention incarnated in the first embodiment described above, there can be realized the control apparatus for the motor-driven power steering system which can ensure a very comfortable steering operation with high security while obviating steep or rapid variations of the steering effort demanded for the driver with a simplified control procedure.

Embodiment 2

In the case of the motor-driven power steering system according to the first embodiment of the invention, the assist torque is generated until the absolute value of the steering torque applied by the driver lowers below a predetermined value even after the operation stop command is commanded. In other words, even when the operation stop command is issued, generation of the assist torque is continued in a similar manner as in the case of the ordinary operation with the steering torque applied by the operator being used as a basis for the assist torque control quantity. However, such steering torque control may equally be adopted that after the operation stop command is generated, minimum values of the steering torques applied by the driver are sequentially latched as the torque control quantities, wherein the steering torque control is stopped at a time point when the absolute value of the assist torque control quantity becomes lower than a predetermined value inclusive thereof. A second embodiment of the invention is directed to the motor-driven power steering control system which incarnates the concept mentioned just above.

Figure 6:
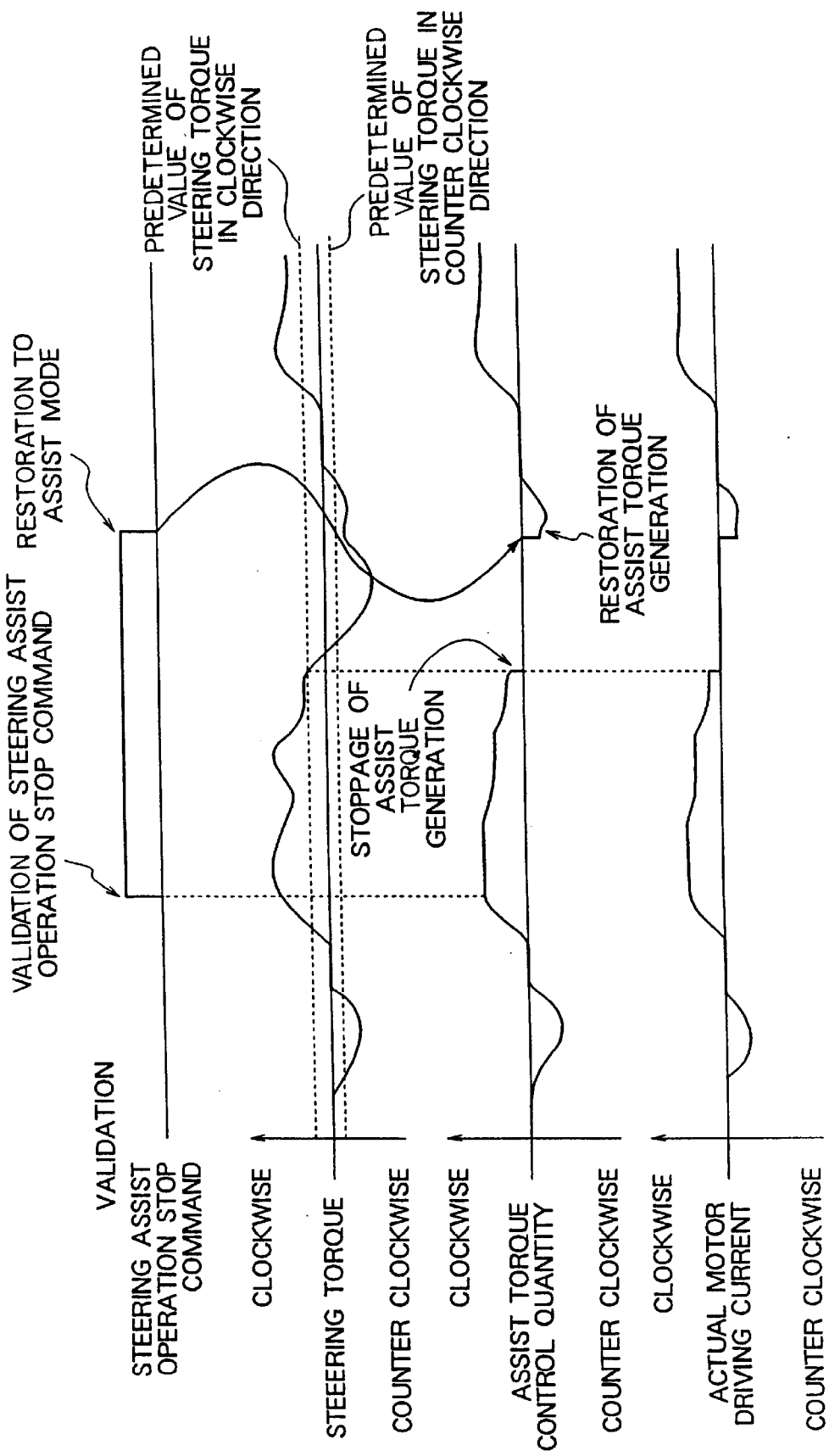
FIG. 6 is a waveform diagram for illustrating a control procedure for stopping an assist torque generating operation by the control apparatus according to the second embodiment of the invention.
Figure 7:
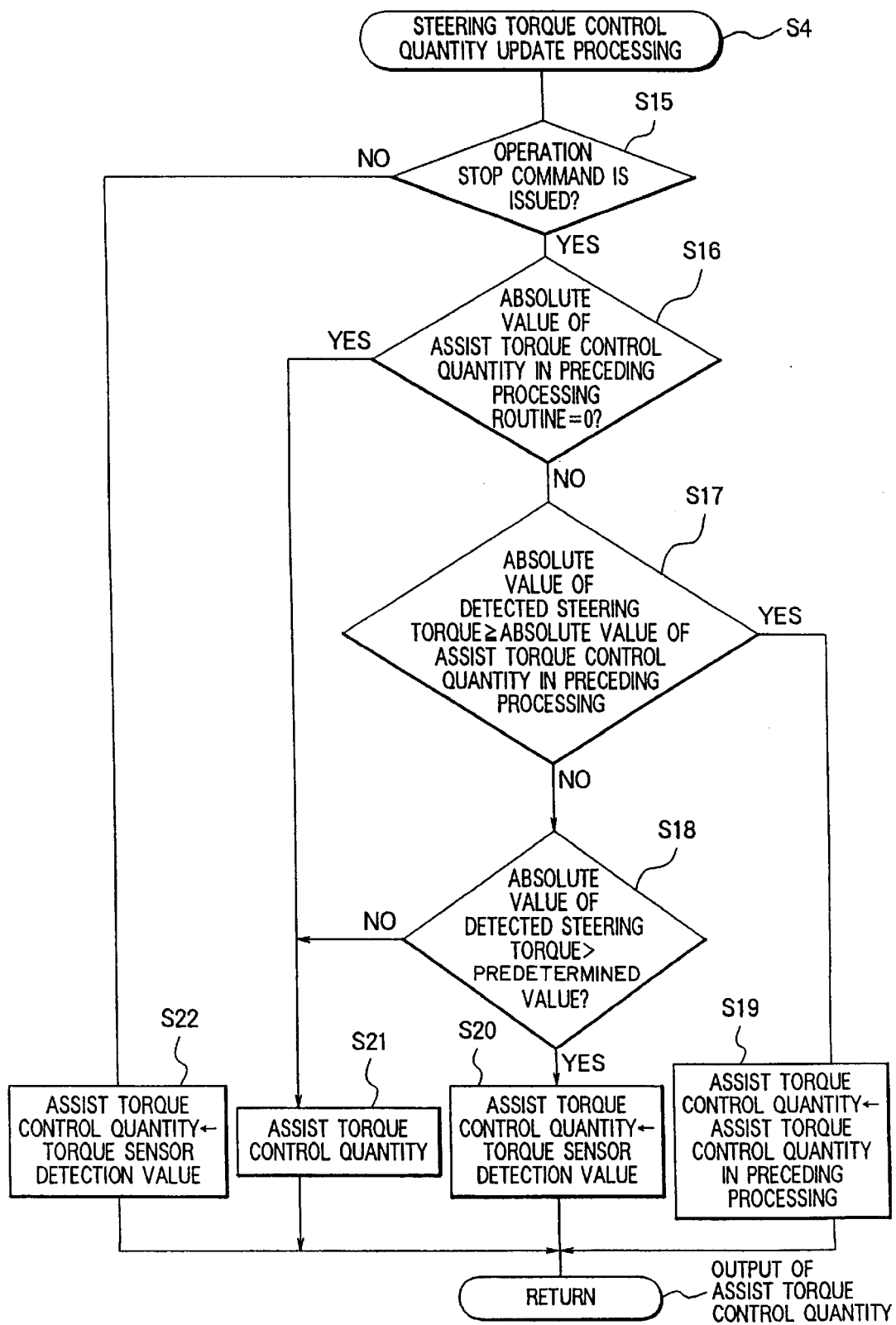
FIG. 7 is a flow chart for illustrating an assist torque control quantity update processing routine according to the second embodiment of the invention.

FIG. 6 is a waveform diagram for illustrating graphically relations among the steering torque, the assist torque control quantity (assist torque) and the actual motor driving current in an operation stop phase of the motor-driven power steering system according to the second embodiment of the invention, and FIG. 7 is a flow chart for illustrating an assist torque control quantity update processing according to the instant embodiment of the invention. Parenthetically, it should be mentioned that the hardware structure of the motor-driven power steering system is similar to that shown in FIG. 1 with the microcomputer-based system configuration being similar to that shown in FIG. 2. Accordingly, the following description will be made with emphasis being put on the assist torque control quantity update processing.

Referring to FIG. 7, the assist torque control quantity update processing in the step S4 is executed at every periodical time interval t1. Additionally, a decision is made as to whether or not the operation stop command is issued (step S15). So long as no operation stop command is issued (i.e., when the answer of the decision step S15 is "NO"), the torque sensor detection value is determined as the assist torque control quantity value (step S22).

On the other hand, when the operation stop command is issued (i.e., when the answer of the decision step S15 is "YES"), it is then checked whether or not the absolute value of the assist torque control quantity determined in the preceding assist torque control quantity update processing routine is zero (step S16). If so ("YES"), the assist torque control quantity is set to zero regardless of the current torque sensor detection value (step S21). Accordingly, once the power steering operation is stopped, the steering torque is not assisted so long as the operation stop command is not cleared (see FIG. 6).

On the contrary, in the case where the absolute value of the assist torque control quantity determined in the preceding processing routine is not zero, the absolute value of the current torque sensor detection value is compared with that of the preceding torque sensor detection value (step S17). When the absolute value of the current torque sensor detection value is smaller than that of the preceding torque sensor detection value, it is then checked whether or not the absolute value of the torque sensor detection value is greater than a predetermined value (step S18). Thus, when the absolute value of the current torque sensor detection value exceeds the predetermined value (i e., when the result of the decision step S18 is affirmative "YES"), then the assist torque control quantity is updated with the current torque sensor detection value (step S20).

In this manner, in the assist torque control quantity update processing executed periodically at a predetermined time interval, the assist torque control quantity is updated with the torque sensor detection value when the absolute value of the torque sensor detection value is greater than the predetermined value. Thus, the detected value of the steering torque decreases as gradually latched until the absolute value of the torque sensor detection value becomes smaller than a predetermined value inclusive When the absolute value of the torque sensor detection value becomes equal to or smaller than the predetermined value, the assist torque control quantity is set to zero (step S21), whereby the actual motor driving current is finally reduced to zero to thereby stop the assist torque generation mode. The state where the assist torque generating operation is stopped is held so long as the operation stop command (output of the OR circuit) is issued continuously.

On the other hand, when the absolute value of the current torque sensor detection value is decided to be greater than that of the preceding torque sensor detection value inclusive in the step S17, the assist torque control quantity is set to be equal to the preceding assist torque control quantity (step S19).

In the motor-driven power steering control system according to the second embodiment of the invention, the power steering torque assist mode is continued with the magnitude of the assist torque being decreased progressively until the steering operation is stopped even when the engine stall takes place in the course of manipulation of the steering wheel by the driver and even when the command (output of the OR circuit) for stopping the operation of the motor-driven power steering system is issued.

Thus, with the motor-driven power steering control system according to the second embodiment of the invention, the steering efforts demanded for the driver is prevented from varying steeply or rapidly. In other words, the steering torque to be applied to the steering wheel by the driver increases progressively, whereby he or she can know without fail that operation of the motor-driven power steering control system will have to be stopped. Thus, the power steering operation mode can smoothly be shifted to the non-effective state.

Besides, even when the key switch is turned off in the state where the assist torque is large as encountered in manipulation of the steering wheel in the state where the motor vehicle is not running or even when the engine stall phenomenon should occur, the assist torque is prevented from decreasing rapidly or steeply. Thus, an undesirable situation can be evaded that the steering wheel is forced to rotate reversely under the influence of elasticity of the torsion bar and/or the tires, which of course incurs great discomfort for the driver. Consequently, it is possible to realize the motor-driven power steering control system which can ensure a very comfortable steering operation with high security.

Embodiment 3

In the case of the motor-driven power steering control systems according to the first and second embodiments of the invention, the control for stopping generation of the assist torque by stopping the driving motor on the basis of the steering torque value as detected is carried out with the assist torque generation mode being maintained continuously until the steering torque detection value (i.e., torque sensor detection value) becomes lower than a predetermined value inclusive thereof.

In this conjunction, it is to be noted that since the motor 20 is employed as the assist torque generating means, the detection of the steering torque may be replaced by the detection of the actual motor driving current, substantially to the same effort, because generation of the assist torque proportionally is controlled by the driving current flowing through the DC motor 20.

Figure 8:
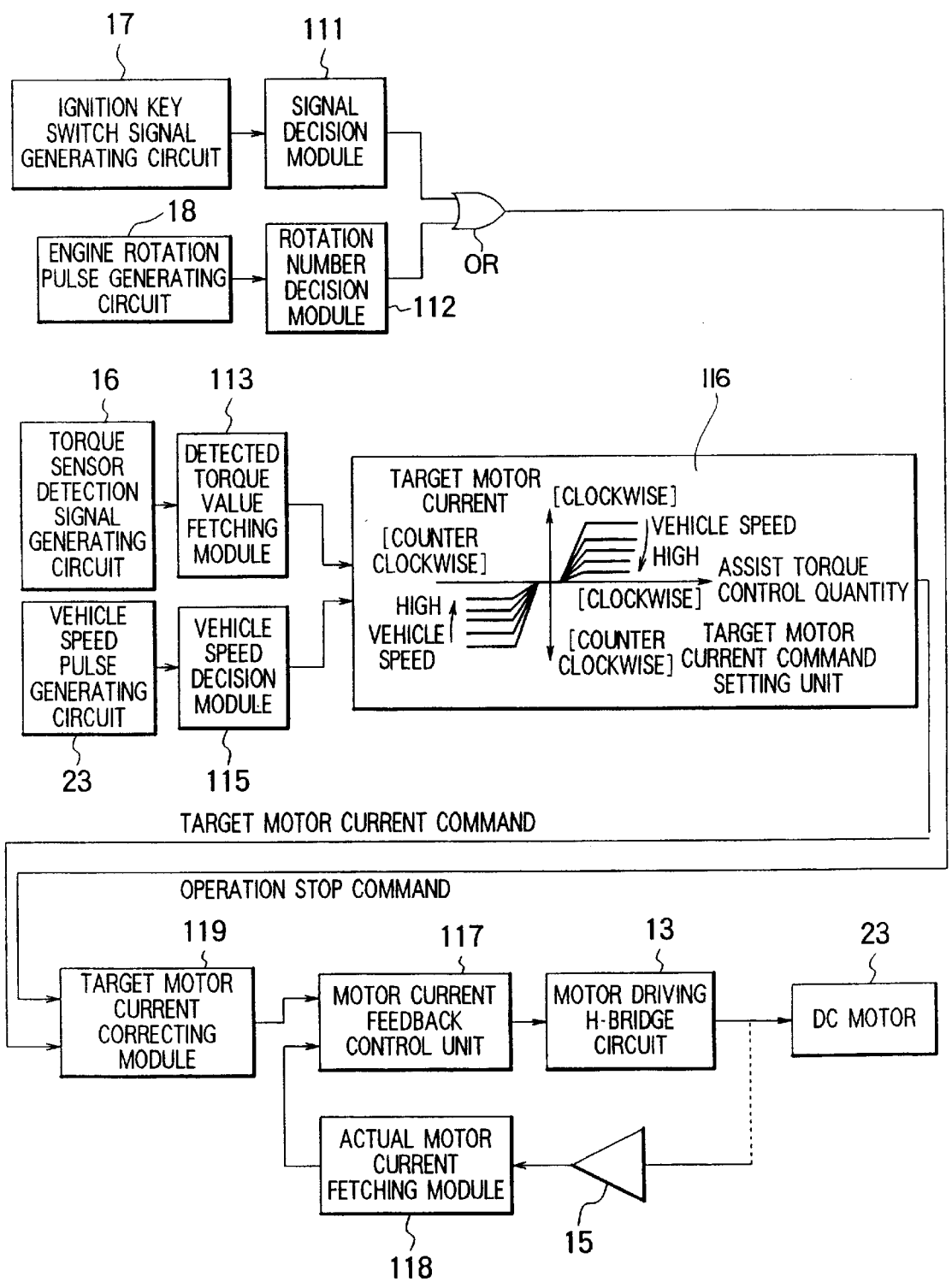
FIG. 8 is a block diagram showing functionally an arrangement of the control apparatus for a power steering system according to the third embodiment of the invention.

FIG. 8 is a block diagram showing functionally an arrangement of the motor-driven power steering control system according to a third embodiment of the invention. Parenthetically, system configuration of the instant embodiment is essentially the same as the one shown in FIG. 1. As can be seen in FIG. 8, the system according to the third embodiment of the invention differs from the first and second embodiments thereof in that the target-motor-current command setting unit 116 is so designed as to determine the target motor current command on the basis of the torque sensor detection value fetched via the detected torque value fetching module 113 and the vehicle-speed decision value decided by the vehicle speed decision module 115.

Furthermore, a target motor current correcting module 119 is provided for checking whether or not the operation stop command is issued, wherein when the operation stop command is absent, indicating the normal operation, the target motor current command set by the target-motor-current command setting unit 116 is used as a corrected target current value. On the other hand, in case the operation stop command is issued, the corrected target current is determined on the basis of a result of comparison between the preset target motor current command and the corrected target current in the preceding processing cycle or routine.

Figure 9:
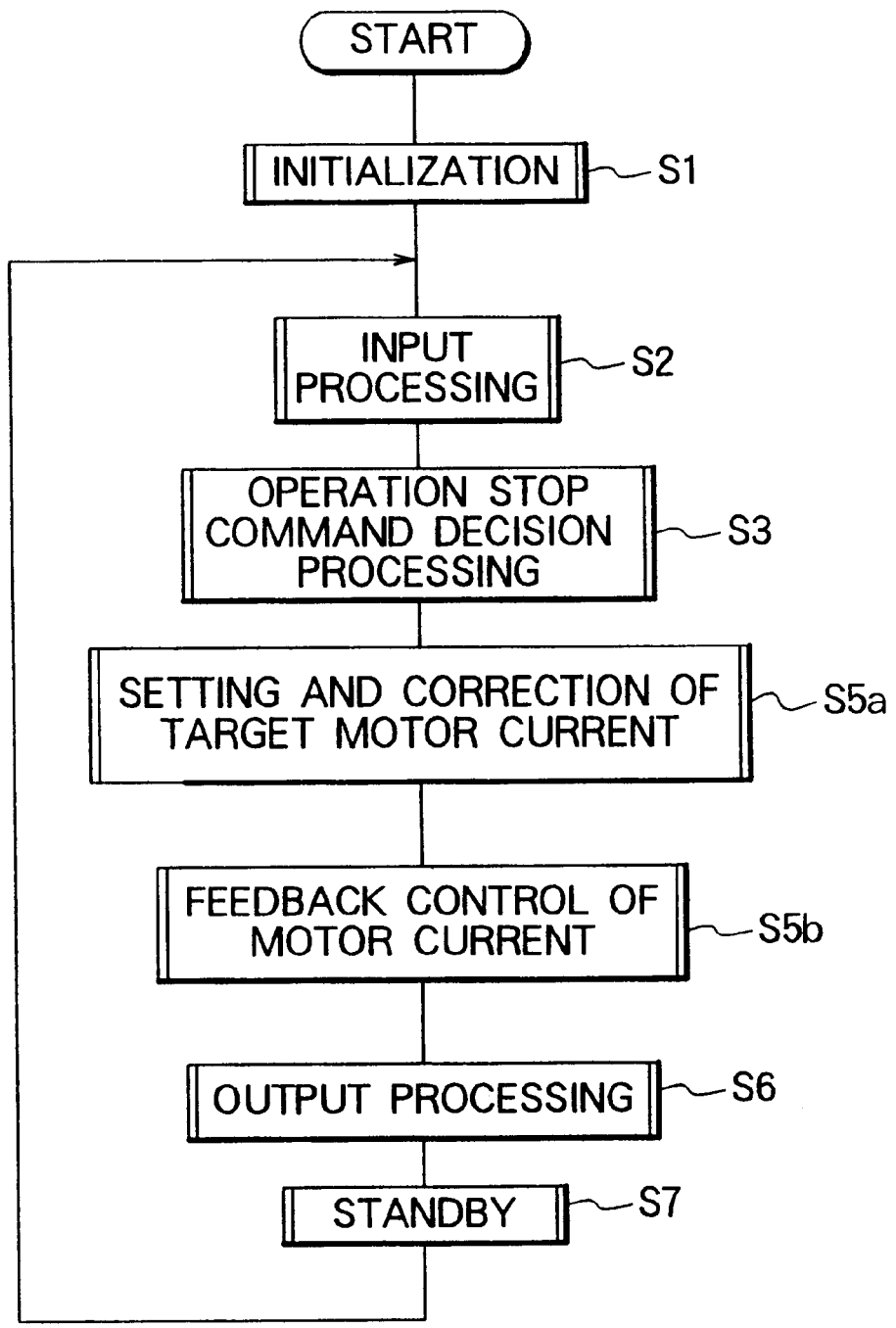
FIG. 9 is a flow chart for illustrating a processing procedure executed by a CPU of the control apparatus according to the third embodiment of the invention.

In the following, operation of the motor-driven power steering control system according to the third embodiment of the invention will be described by reference to flow charts shown in FIGS. 9 and 10, in which FIG. 9 is a flow chart for illustrating a processing procedure executed by the CPU 11a of the motor-driven power steering control system. At this juncture, it should be mentioned that the processing procedure illustrated in FIG. 9 is essentially the same as that described hereinbefore by reference to FIG. 4 except that the assist torque control quantity update processing in the step S4 is replaced by a processing step S5a for setting a target motor current command and correcting the same, while the target motor current command setting and motor current feedback control processing step S5 shown in FIG. 4 is replaced by a motor current feedback control processing step S5b.

FIG. 20 is a flow chart for illustrating in detail a subroutine for executing the target motor current setting/correcting processing in the step S5a shown in FIG. 9. Referring to FIG. 10, an intrinsic target motor current command value is first determined on the basis of the vehicle-speed decision value and the torque sensor detection value (step S23). Subsequently, it is checked whether or not the operation stop command is issued (step S24), wherein unless the operation stop-command is issued, indicating the normal operation, the target motor current command determined in the step S23 is used as a corrected target current value.

On the other hand, when the operation stop command is issued, it is then checked in a step S25 whether or not the preceding corrected target current command value set in a step S31 is "0" (zero). When this value is "0" (zero) (i.e., when the decision step S25 results in affirmation or "YES"), the corrected target current is set to zero in a step S30. However, when the preceding corrected target current command value is not "0" (zero) (i.e., when the decision step S25 results in negation or "NO"), then it is decided in a step S26 whether or not the target motor current command value determined in the step S23 is greater than a predetermined value.

Unless the target motor current command value is greater than the predetermined value (i.e., when the decision step S26 results in negation or "NO"), the corrected target current is set to zero in the step S30. On the contrary, in case the target motor current command value is greater than the predetermined value (i.e., when the answer of the decision step S26 is affirmative "YES"), then it is checked in a step S27 whether or not the target motor current command value determined in the step S23 is greater than the preceding corrected target current command value. When the answer of the decision step S27 is negative "NO", the target motor current command value determined in the step S23 is set as the corrected target current (step S29). If otherwise, the preceding corrected target current command value is set as the corrected target current (step S28). The corrected target current determined in this manner is utilized for driving the DC motor 20 through the motor current feedback control in the step S5b.

Thus, in the motor-driven power steering control system according to the third embodiment of the invention, the power steering torque assist mode is continued with the magnitude of the assist torque being decreased progressively until the steering operation is stopped even when the engine stall takes place in the course of manipulation of the steering wheel of the driver and even when the control system detects the command for stopping the operation of the motor-driven power steering system (indicated by the output of the OR circuit). Consequently, with the motor-driven power steering control system according to the instant embodiment, the steering efforts demanded for the driver is prevented from varying steeply or rapidly. In other words, the steering torque to be applied to the steering wheel by the driver increases progressively, whereby he or she can certainly recognize that operation of the motor-driven power steering control system will have to be stopped.

Figure 10:
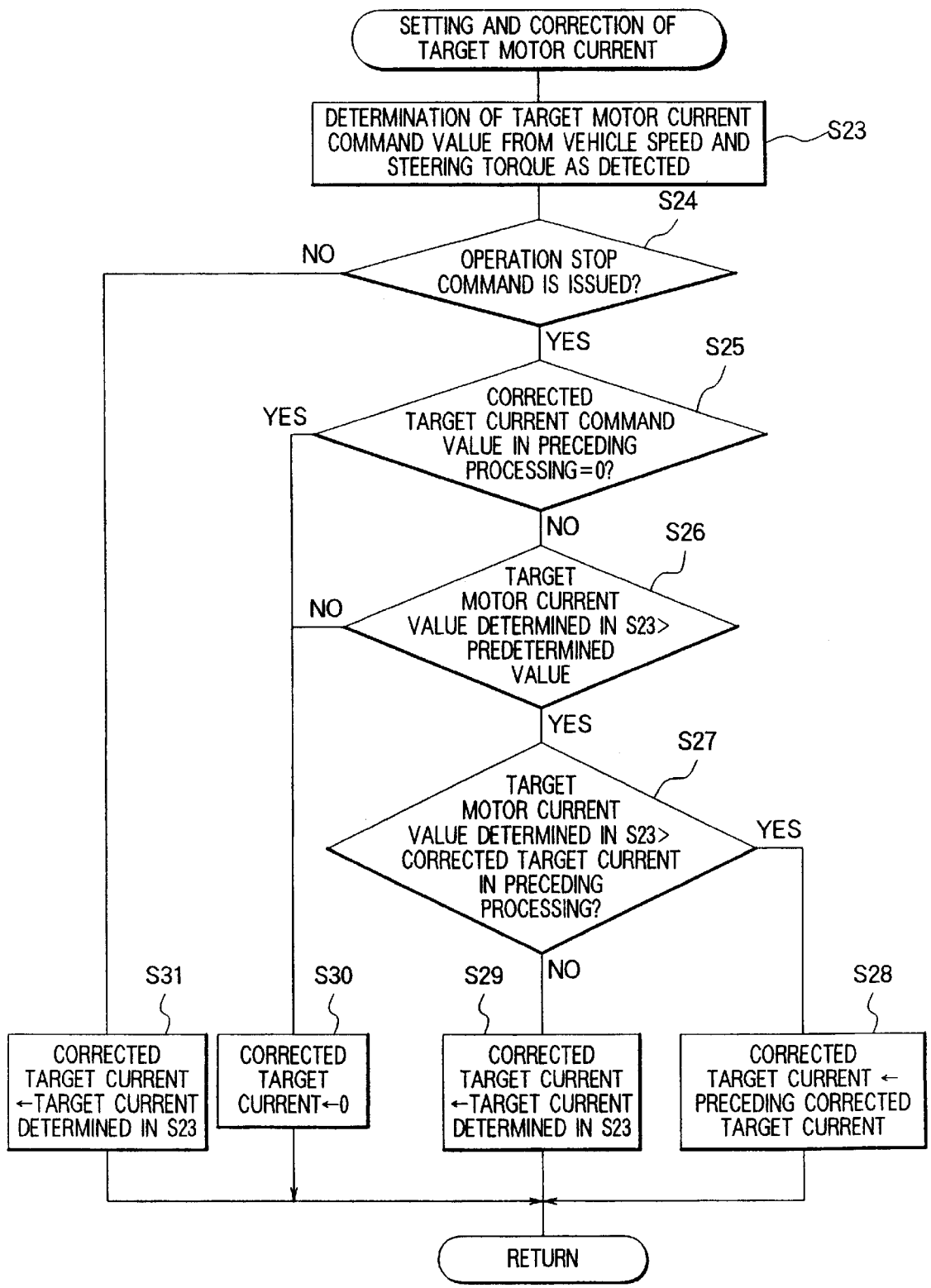
FIG. 10 is a flow chart for illustrating a procedure for setting and correcting a target motor current value according to the third embodiment of the invention.
Figure 11:
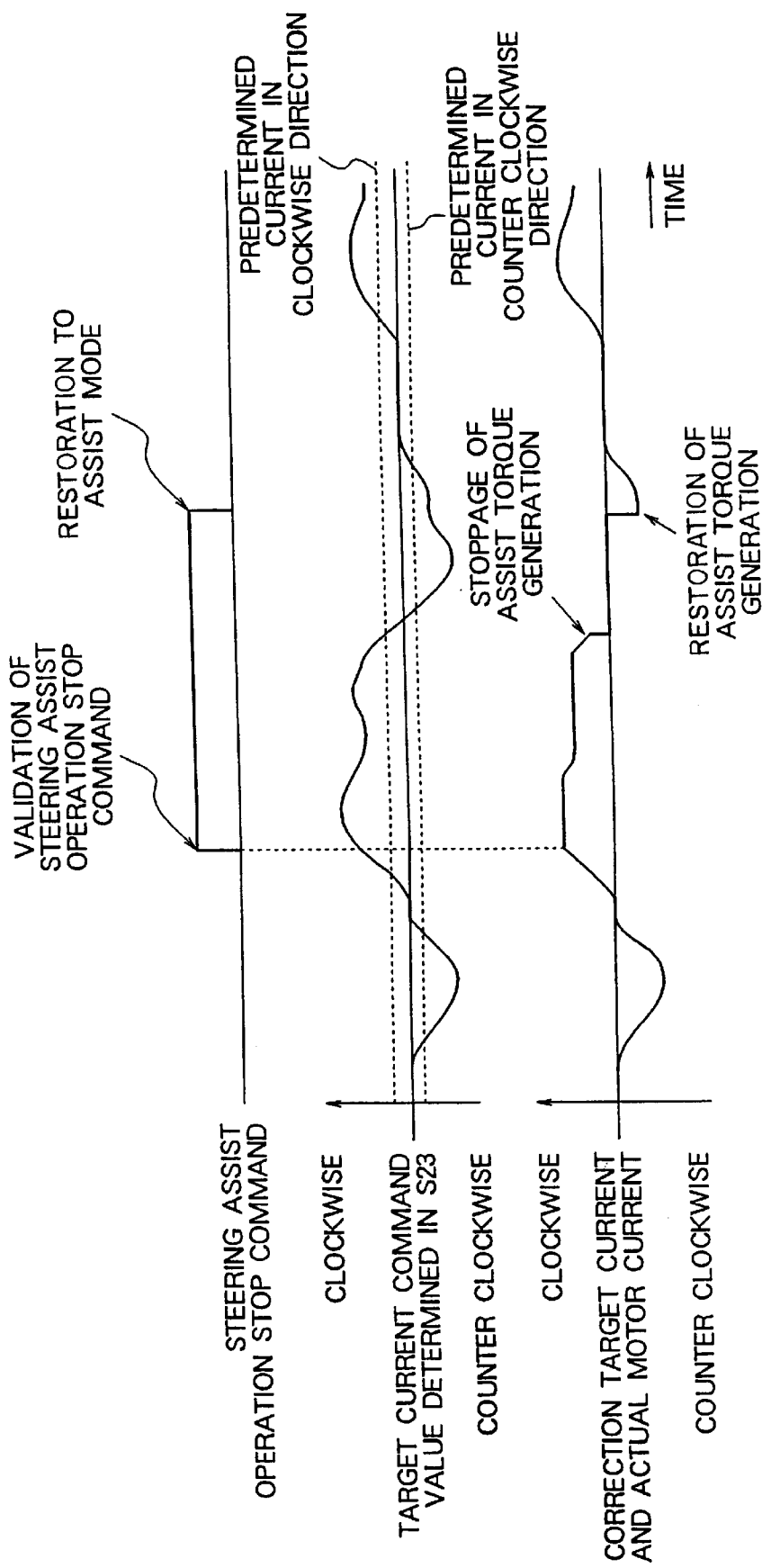
FIG. 11 is a waveform diagram for illustrating operation of the control apparatus according to the third embodiment of the present invention.

When the processing steps S27 and S28 are deleted from the processing procedure shown in FIG. 10, the ordinary assist torque generating operation is continuously performed until the actual motor driving current becomes lower than a predetermined motor current command value, as in the case of the motor-driven power steering control system according to the first embodiment of the invention.

Furthermore, in the motor-driven power steering control system according to the third embodiment of the invention, the motor current command value is employed for controlling the generation of the assist torque as well as stoppage thereof in dependence on the decrease of the steering torque. However, it should be appreciated that the motor driving current detection value may be employed in place of the motor current command value, substantially to the same effort.

Embodiment 4

In the case of the motor-driven power steering control systems described above in conjunction with the first, second and third embodiments of the invention, generation of the assist torque is sustained continuously so long as the driver manipulates the steering wheel even after the operation stop command (output of the OR circuit) is issued, which will incur useless power consumption of the battery, to a disadvantage. For coping with this, it is proposed according to the invention incarnated in a fourth embodiment thereof that a timer (i.e., time counter) is provided for measuring a time lapsed from detection of the operation stop command to thereby allow the assist torque generating mode to be invalidated upon lapse of a predetermined time.

Figure 12:
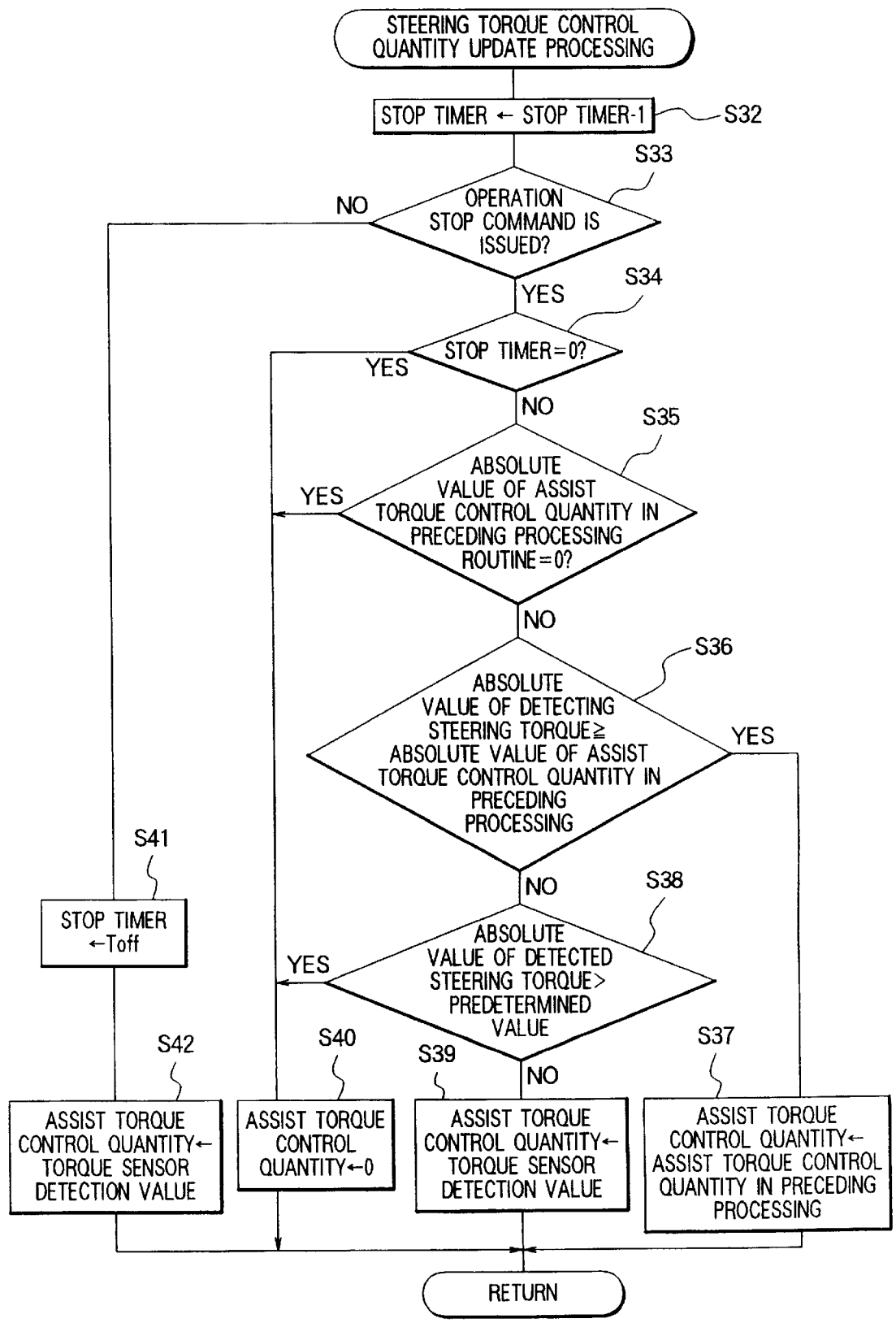
FIG. 12 is a flow chart for illustrating an assist torque control quantity update processing procedure according to the fourth embodiment of the invention.

Operation of the motor-driven power steering control system according to the fourth embodiment of the invention will be described by reference to FIG. 12 and a waveform diagram of FIG. 13, in which FIG. 12 is a flow chart for illustrating an assist torque update processing for updating the assist torque to the torque sensor detection values sequentially in response to issuance of the operation stop command within a time preset by a timer and setting the assist torque to zero upon lapse of the preset time. Parenthetically, system configuration of the instant embodiment is essentially the same as that shown in FIGS. 1 and 2.

Every time the assist torque control quantity update processing is validated, "1" is subtracted from a timer value $T_{off}$ preset in the timer mentioned above (step S32). So long as the operation stop command is not issued (step S33), the time measuring operation is stopped by resetting the timer to the initial state, which is then followed by setting of the assist torque on the basis of the torque sensor detection value (step S42).

On the contrary, when it is decided at the step S32 that the timer value becomes zero (i.e., time-up) after lapse of a time duration given by $T_{off} \times T1$ (where T1 represents a temporal duration of the periodical processing or control cycle), then the assist torque is decreased to zero by setting the actual motor driving current to zero for thereby stopping generation of the assist torque for the steering (step S40).

On the other hand, when the operation stop command is issued (step S33) and unless the timer value is zero (step S34), the assist torque is progressively updated, while checking whether or not the absolute value of the steering torque determined in the preceding assist torque update processing routine is zero (step S35). If so ("YES"), the assist torque is always set to zero regardless of the current torque sensor detection value (step S40). Once the power steering operation is stopped, no assist torque is generated for the steering until the operation stop command is cleared (see FIG. 13).

On the contrary, in case the absolute value of the assist torque determined in the preceding processing routine is not zero (step S35), the absolute value of the current torque sensor detection value is compared with that of the preceding torque sensor detection value (step S36). When the torque sensor detection value is smaller than the preceding torque sensor detection absolute value, it is then checked whether or not the current torque sensor detection absolute value is greater than a predetermined value (step S38). In that case, when the torque sensor detection absolute value exceeds the predetermined value (i.e., when the result of the decision step S38 is affirmative "YES"), then the magnitude of the assist torque is updated on the basis of the torque sensor detection value (step S39).

In the assist torque control quantity update processing executed in the succeeding routine, the assist torque is updated with the torque sensor detection value when the torque sensor detection absolute value is greater than the predetermined value. In this manner, the value of the steering torque as latched decreases gradually until the absolute value of the torque sensor detection value becomes smaller than a predetermined value inclusive. When the absolute value of the torque sensor detection value becomes equal to or smaller than the predetermined value, the assist torque control quantity is set to zero (step S40), whereby the actual motor driving current is finally reduced to zero, to thereby stop the assist torque generation mode. The state where the assist torque generating operation is stopped is held so long as the operation stop command is issued continuously.

On the other hand, when the absolute value of the torque sensor detection value is decided to be greater than that of the preceding torque sensor detection value determined in the step S36, the assist torque control quantity is set equal to the preceding assist torque control quantity (step S37).

As is apparent from the above description, every time the assist torque control quantity updating module 114 implemented by the CPU 11a performs the processing for stopping the assist torque generating operation, it is determined whether or not a predetermined time has lapsed after issuance of the operation stop command, wherein the assist torque generation is disabled without fail when a predetermined time has lapsed. Thus, the assist torque generating operation mode can be invalidated effectively while ensuring steering comfortableness even when the assist torque generating is stopped.

Many modifications and variations of the present invention are possible in the light of the above techniques It is therefore to be understood that within the scope of the appended claims, the invention may be practiced otherwise than as specifically described.

What is claimed is:

1. A control apparatus for a motor-driven power steering system of a motor vehicle, comprising:

operation stop decision means for deciding whether or not an operation stop command is to be issued for stopping control operation for said motor-driven power steering system;

torque detecting means for detecting a steering torque transmitted from an input shaft to an output shaft of a steering column of said motor-driven power steering system; and assist torque control means for updating an assist torque applied by an electric motor to said output shaft with an assist torque control quantity determined on the basis of a detected torque value outputted from said torque detection means by monitoring a detection output signal of said torque detection means;

wherein upon issuance of said operation stop command by said operation stop decision means, said assist torque control means stops application of said assist torque, provided that said detected torque value is lower than a predetermined value inclusive thereof;

wherein when said assist torque control means detects that the assist torque applied to said steering system decreases on the basis of said detection output signal of said torque detection means upon issuance of said operation stop command, said assist torque control means updates said assist torque control quantity with a minimum value of said detection output signal of said torque detection means to thereby limit magnitude of said assist torque applied to said steering system in conformance with said minimum value; and wherein when the steering torque detected by said steering torque detection means becomes smaller than a predetermined value inclusive, said assist torque control means stops generation of said assist torque.

2. A control apparatus for a motor-driven power steering system of a motor vehicle according to claim 1, further comprising:

timer means for counting a time lapse from a time point at which said operation stop command is issued;

wherein said assist torque control means stops generation of said assist torque when said time lapse exceeds a predetermined value.

3. A control apparatus for a motor-driven power steering system of a motor vehicle, comprising:

operation stop decision means for deciding whether or not an operation stop command is to be issued for stopping control operation for said motor-driven power steering system;

torque detecting means for detecting a steering torque transmitted from an input shaft to an output shaft of a steering column of said motor-driven power steering system; and assist torque control means for updating an assist torque applied by an electric motor to said output shaft with an assist torque control quantity determined on the basis of a detected value of a motor current flowing through said electric motor by monitoring said motor current;

wherein upon issuance of said operation stop command by said operation stop decision means, said assist torque control means stops application of said assist torque, provided that said detected value of said motor current is lower than a predetermined value inclusive thereof;

wherein when said assist torque control means detects that the motor current flowing through said electric motor decreases on the basis of said detected current value upon issuance of said operation stop command, said assist torque control means updates said assist torque control quantity with a minimum value of said motor current to thereby limit magnitude of said assist torque applied to said steering system in conformance with said minimum value; and wherein when the motor current becomes smaller than a predetermined value inclusive, said assist torque control means stops generation of said assist torque.

4. A control apparatus for a motor-driven power steering system of a motor vehicle according to claim 3, wherein in place of said motor current flowing through said electric motor, a motor driving current command value determined on the basis of at least said detected steering torque is employed.

5. A control apparatus for a motor-driven power steering system of a motor vehicle according to claim 3, further comprising:

timer means for counting a time lapse from a time point at which said operation stop command is issued;

wherein said assist torque control means stops generation of said assist torque when said time lapse exceeds a predetermined value.

* * * * *